3,274,299
O,O-DIALKYL NITROPHENOXYMETHYL-PHOSPHOROTHIOATES

Edward N. Walsh, Chicago Heights, Ill., and John G. Brady, Campbell, Calif., assignors to Stauffer Chemical Company, New York, N.Y., a corporation of New York
No Drawing. Filed May 17, 1963, Ser. No. 281,324
5 Claims. (Cl. 260—951)

The present invention is concerned with a novel group of phosphorothioates and phosphorodithioates, their method of preparation and use as pesticides.

The novel compounds may be represented by the general formula:

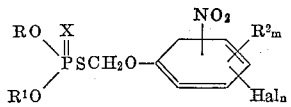

wherein R, $R^1$, and $R^2$ are 1 to 4 carbon alkyls, X is selected from the group consisting of oxygen and sulfur, and $m$ and $n$ are integers from 0 to 3 inclusive, with the sum of $m+n$ not exceeding 3. The member designated "Hal" in this formula stands for one or more halogen atoms selected from the group consisting of fluorine, chlorine, bromine, and iodine.

The general process for preparing the compounds of the invention is illustrated by the following equation:

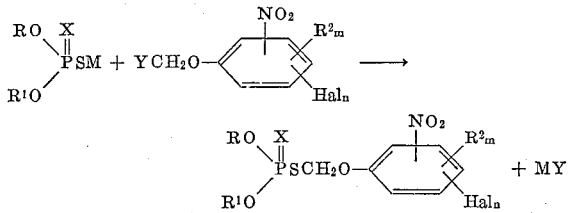

wherein M is an alkali metal, Y is a halogen selected from chlorine, bromine and iodine, and all of the remaining substituents are the same as defined above. The reaction is preferably carried out in the presence of an inert organic solvent such as acetone, benzene, ether, and the like. Reaction temperature, while it need not be critically controlled, is normally maintained between about 0° C. and 150° C., preferably between 20° C. and 100° C. The reaction normally furnishes 80 to 100% of the theoretical stoichiometric yield.

The following examples illustrate specific compounds of the invention and their method of preparation, but should not be construed as unduly limiting the broader aspects of the invention.

EXAMPLE 1

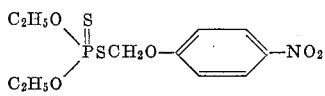

Six grams of

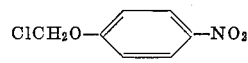

100 cc. of acetone, and 10.0 grams of $NaSP(S)(OC_2H_5)_2$ were placed in a flask and stirred overnight at room temperature. The reaction mixture was then refluxed for four hours, cooled, and filtered. The filter cake was rinsed with 50 cc. of acetone. The filtrate was poured into 500 cc. of ice water and extracted twice with ether (300 cc. per extraction). The organic layer was then counter-washed three times: first with 100 cc. of 3% sodium carbonate solution, then with 50 cc. of 3% sodium carbonate solution, and finally with 50 cc. of distilled water. The ether solution was then dried over sodium sulfate and concentrated to 60° C. at 1 mm. Hg to yield 9.0 grams of O,O-diethyl-S-(4-nitrophenoxymethyl) phosphorodithioate, having an index of refraction, $$N_D^{25} = 1.5781$$

(yield=83% of theory). By elemental analysis, the product was found to contain 10.0% P, 20.0% S, and 3.8% N compared to a calculated theoretical value of 9.7% P, 19.0% S, and 4.1% N.

EXAMPLE 2

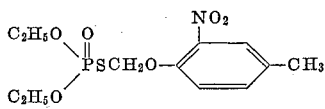

To 3.3 grams of $(C_2H_5O)_2P(O)SNa$ in 50 ml. of acetone was added 3.0 grams of

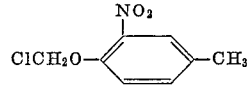

The mixture was refluxed for four hours, cooled, and poured into 300 ml. of ice water. The oil was extracted from the ice water with ether (two extractions using 100 ml. of ether each time) and counter-washed with 25 ml. of water. The ether solution was then dried over sodium sulfate and concentrated to 60° C. at 1 mm. of Hg to yield 5.0 grams (98% yield) of O,O-diethyl-S-(4-methyl-2-nitrophenoxy-methyl) phosphorothioate having an index of refraction, $N_D^{25} = 1.5226$. The product was analyzed and found to contain 10.5% P, 10.4% S, and 3.5% N compared to the theoretical calculated value of 9.2% P, 9.7% S, and 4.2% N.

EXAMPLE 3

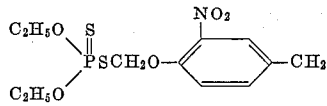

To 3.5 grams of $(C_2H_5O)_2P(S)SNa$ in 50 ml. of acetone was added 3.0 grams of

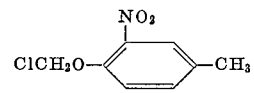

The mixture was refluxed for four hours and washed, extracted, and counter-washed by the same procedure described in Example 2, supra, to yield 5.0 grams (95.2% yield) of O,O-diethyl-S-(4-methyl-2-nitrophenoxy-methyl) phosphorodithioate having an index of refraction, $$N_D^{25} = 1.5624$$

Upon analysis of the product, 9.0% P, 18.8% S, and 3.5% N were found compared to 8.8% P, 18.3% S, and 4.0% N, the theoretical calculated values.

EXAMPLE 4

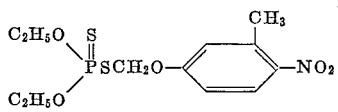

Four grams of

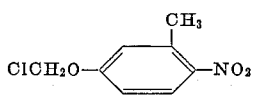

was added to 4.0 grams of $(C_2H_5O)_2P(S)SNa$ in 50 ml. of acetone. The mixture was then refluxed for three hours, cooled, and filtered. The filter cake was rinsed with 15 ml. of acetone. The filtrate was evaporated and the residue dissolved in 200 ml. of ether. The ether solution was then twice washed, once with 50 ml. of water, and once with 50 ml. of a 1% sodium hydroxide solution. The aqueous phases resulting when washing the ether solution, were separately collected and counter-washed with ether to remove any dissolved product. The two ether solutions were combined and the product was concentrated to 60° C. at 1 mm. Hg. The concentrate was found to comprise 7.0 grams (98% yield) of O,O-diethyl-S-(3-methyl-4-nitrophenoxy-methyl) phosphorodithioate, having an index of refraction, $N_D^{25}=1.572$ and an analysis of 8.8% P, 17.5% S, and 4.0% N, compared to the theoretical calculated values of 8.8% P, 18.1% S, and 4.0% N.

EXAMPLE 5

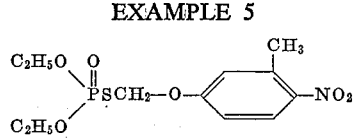

Four grams of

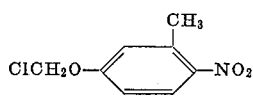

was added to 3.7 grams of $(C_2H_5O)_2P(O)SNa$ in 50 ml. of acetone. The mixture was refluxed three hours. The reaction product was cooled and washed according to the procedure described in Example 4 to yield 6.7 grams (100%) of O,O-diethyl-S-(3-methyl-4-nitrophenoxy-methyl) phosphorothioate. The product had an index of refraction, $N_D^{25}=1.5419$ and an analysis of 9.0% P, 9.0% S, and 4.2% N, compared to the theoretical calculated values of 9.2% P, 9.5% S, and 4.1% N.

EXAMPLE 6

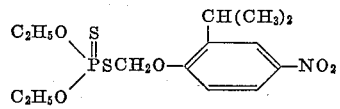

To a flask containing 50 ml. of acetone was added 4.0 grams of $(C_2H_5O)P(S)SNa$ and 3.3 grams of

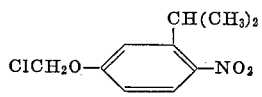

After being heated to reflux for four hours, the reaction mixture was poured into 300 ml. of ice water and extracted with ether twice (200 ml. each). The organic layer was recovered and concentrated to 60° C. at 1 mm. Hg to yield 5.0 grams of O,O-diethyl-S-(4-nitro-2-isopropylphenoxymethyl) phosphorodithioate. Elemental analysis of the product showed 8.2% P, 17.2% S, and 3.0% N, compared to 7.8% P, 16.1% S, and 3.5% N, the theoretical calculated values.

EXAMPLE 7

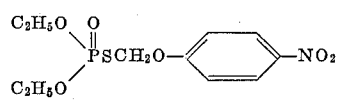

To 5.0 grams of

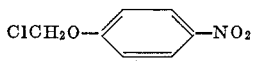

in 100 ml. of acetone was added 6.7 grams of $(C_2H_5O)_2P(O)SNa$

The mixture was refluxed for two hours and then cooled. The reaction mixture was then filtered and the filtrate was evaporated on a steam batch. The residue was placed in 100 ml. of ether and washed with 50 ml. of water, and then with 50 ml. of 3% sodium carbonate solution. The ether solution was then dried over sodium sulfate and concentrated to furnish a residue at 60° C. and 1 mm. Hg of 8.0 grams (93% yield) of O,O-diethyl-S-(4-nitrophenoxymethyl) phosphorothioate having an index of refraction, $N_D^{25}=1.5398$. Upon analysis of the product, 10.9% P, 9.4% S, and 4.0% N were found, compared to the theoretical calculated values of 9.7% P, 10.0% S, and 4.4% N.

Using the general procedures described in Examples 1 through 7 above the following specific compounds may also be prepared:

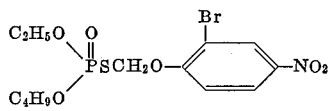

O-ethyl-O-(-n-butyl)-S-(-2-bromo-4-nitrophenoxymethyl) phosphorothioate

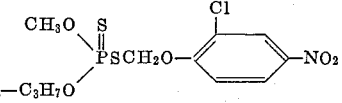

O-methyl-O-(isopropyl)-S-(2-chloro-4-nitrophenoxymethyl) phosphorodithioate

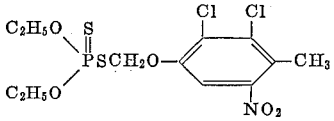

O,O-diethyl-S-(2,3-dichloro-4-methyl-5-nitrophenoxymethyl) phosphorodithioate

The novel compounds shown in the above examples have been found to be generally active as pesticides. More specifically, the compounds have shown toxic activity towards caterpillars, aphids, mites, and various insect species, while exhibiting a low degree of phytotoxicity. Toward mites, the compounds exhibit high activity on both embryonic and post-embryonic forms. The combination of high pesticidal activity and low phytotoxicity makes the novel compounds highly suitable for agricultural applications wherein the toxicant may be applied directly to growing plants, or mixed into the soil about the roots of such plants.

Pesticidal activity is illustrated in Table I wherein the percentage kill among a group of test species is reported for a specified quantity of the candidate compound, expressed in micrograms (herein termed the bioassay test) or for a percentage concentration for the compound in an inert carrier or diluent (herein termed the screening test). A slanted line is used to separate the percentage kill (on the left) from the percentage concentration or amount. In the table the various pest species are assigned the following numbers:

(1) House fly—*Musca domestica* (Linn.).
(2) American cockroach—*Periplaneta americana* (Linn.).
(3) Spotted milkweed bug—*Oncopeltus fasciatus* (Dallas).

(4) Confused flour beetle—*Tribolium confusum* (Duvol).
(5) Two-spotted mite—*Tetranychus telarius* (Linn.).
(6) Salt-marsh caterpillar—*Estigmene acrea* (Drury).

TABLE I.—PESTICIDAL ACTIVITY

| Compound (Example Number) | Species Number | | | | | | |
|---|---|---|---|---|---|---|---|
| | 1 | 2 | 3 | 4 | Post Embryonic 5 | Eggs 5 | 6 |
| 1 | 30/4 μg | Percent 100/0.1 | Percent 100/0.1 | 100/10 μg | Percent ---- | Percent ---- | Percent 100/0.05 |
| 2 | 100/0.1% | 60/0.1 | 20/0.1 | ---- | 75/0.01 | ---- | ---- |
| 3 | 100/0.1% | 40/0.1 | ---- | ---- | 90/0.1 | ---- | 80/0.1 |
| 4 | 100/0.1% | 20/0.1 | ---- | ---- | 100/0.1 | 100/0.1 | 50/0.1 |
| 5 | 100/0.1% | 60/0.1 | 60/0.1 | ---- | 100/0.1 | 50/0.1 | 70/0.1 |
| 6 | 100/0.1% | ---- | ---- | ---- | 90/0.01 | ---- | ---- |
| 7 | 60/1 μg | 80/0.05 | 100/0.05 | 100/0.1% | 10/0.005 | 30/0.005 | 100/0.05 |

In the screening test for species numbered 1 to 4 in Table I above, adult houseflies and nymphs of the American or German cockroach, and spotted milkweed bug, are caged in cardboard mailing tubes with cellophane bottoms and coarse mesh nylon tops, and supplied with food and water. From ten to twenty-five insects are employed per cage, depending on the species. Candidate pesticides are dissolved in 10 ml. of a suitable solvent, usually acetone. Aliquots of the toxicant solution are suspended in water containing 0.0175% by volume Sponto 221, an emulsifying agent, and sprayed on the caged insects. All compounds are sprayed initially at 0.1% by spraying with a DeVilbiss hand sprayer at 20 p.s.i. in a fume hood. Final mortality readings are taken after seventy-two hours.

The salt-marsh caterpillar is screened in the following manner: Dock leaves, approximately five inches long, are dipped in aqueous suspensions of the test materials for ten seconds. The leaves are then placed in one-pint food containers with the petioles projecting through small holes in the bottoms into vials containing tap water. Five third instar (8–10 days old) salt marsh larvae are introduced and in the container closed with a petri dish lid. Mortality readings are taken at twenty-four and forty-eight hours.

The two-spotted mite, identified as No. 5 in Table I, is screened for both contact-stomach, as well as systemic activity. In screening for contact-stomach activity, young pinto bean plants in the primary leaf stage are used as the host plants. The initial concentration is 0.1%. The dip plants are transferred to the greenhouse and the post-embryonic, nymphal, ovicidal, and phytocidal activity determined after seven days. For systemic screening, the pinto bean plants are placed in tubes and held in place with cotton plugs. Only the roots are immersed. The solutions are prepared by dissolving the compounds in a suitable solvent, usually acetone, and then diluting with distilled water. The final acetone concentration never exceeds 1%. The toxicants are initially tested at a concentration of 10 p.p.m. After the plants are placed in the test solutions, they are infested with mites. Mortalities of post-embryonic, nymphal, and ovicidal forms are determined after seven days.

In the housefly bioassay test, cages sush as those described above for the screening tests, are used. Acetone solutions of the candidate materials are prepared and measured aliquots are placed in petri dishes having a surface area of 18.8 sq. cm. One ml. of a suspension of peanut oil in acetone is added as a filming agent. The solvent is evaporated by air drying and groups of twenty-five female flies, three to five days old, are exposed to the residue in the petri dishes which are placed in the cages. Final mortality readings are taken forty-eight hours after initiation of the test.

The candidate compounds applied in the above screening tests were generally in the form of aqueous dispersions, although the same compounds may also be used commercially in the form of aqueous solutions, when appreciably soluble; non-aqueous solutions; wettable powders; vapors; and dusts; as will best suit the contemplated use. In some applications, fillers will be incorporated with the toxic compounds. For more specialized applications, the toxicant may even be used in its pure, undiluted form.

Where used herein, the term "pest" is intended in the restricted sense generally recognized in the art as applying to the lower forms of life customarily controlled by chemical means and excluding the higher animals, the vertebrates, for example, rodents, birds, and larger forms which are more commonly controlled by mechanical means such as traps. It will be apparent to one skilled in the art that the toxic activity demonstrated hereinbefore on various mites, insects, and caterpillars is indicative of activity with species and orders not specifically shown.

The foregoing description is given for clearness of understanding only, and no unnecessary limitations should be understood therefrom, as modifications will be obvious to those skilled in the art.

We claim:
1. A compound having the formula:

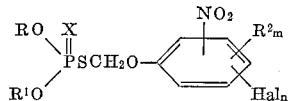

wherein R, $R^1$, and $R^2$ are 1 to 4 carbon alkyl, X is a member selected from the group consisting of oxygen and sulfur, Hal represents a halogen atom, and $m$ and $n$ are integers from 0 to 3 inclusive, with the sum of $m+n$ not greater than 3.

2. O,O-diethyl-S-(4-nitrophenoxymethyl) phosphorodithioate.

3. O,O-diethyl - S - (4 - methyl-2-nitrophenoxymethyl) phosphorothioate.

4. O,O - diethyl-S-(4-nitro-2-isopropylphenoxymethyl) phosphorodithioate.

5. O,O - diethyl-S-(4-nitrophenoxymethyl) phosphorothioate.

References Cited by the Examiner

UNITED STATES PATENTS

| 2,565,921 | 8/1951 | Hook et al. | 260—461 |
| 2,586,655 | 2/1952 | Hook et al. | 260—461 |
| 2,611,729 | 9/1952 | Bartlett et al. | 167—30 |
| 2,954,318 | 9/1960 | Ludvik | 167—30 |

FOREIGN PATENTS

| 544,659 | 2/1956 | Belgium. |
| 772,213 | 4/1957 | Great Britain. |

CHARLES B. PARKER, *Primary Examiner.*

IRVING MARCUS, *Examiner.*

F. M. SIKORA, *Assistant Examiner.*